United States Patent
Guinzy et al.

[15] 3,696,331
[45] Oct. 3, 1972

[54] AUTOMATED PROCESS FOR DETERMINING SUBSURFACE VELOCITIES FROM SEISMOGRAMS

[72] Inventors: Norman J. Guinzy, Austin; Clyde W. Kerns, Irving; William H. Ruehle, Duncanville; Henry E. Teague, Arlington, all of Tex.

[73] Assignee: Mobil Oil Corporation

[22] Filed: July 22, 1970

[21] Appl. No.: 57,254

Related U.S. Application Data

[63] Continuation of Ser. No. 769,590, Oct. 22, 1968, abandoned, which is a continuation-in-part of Ser. No. 752,600, Aug. 14, 1968, abandoned.

[52] U.S. Cl............................................340/15.5 DP, TD, 340/15.5 CP, 444/1
[51] Int. Cl..............................................G01v 1/28
[58] Field of Search.....340/15.5 CC, 15.5 TD, 15.5 CD, 340/15.5 DP

[56] References Cited
UNITED STATES PATENTS 3,417,370 12/1968 Brey........................340/15.5
3,611,278 10/1971 Guinzy et al............340/15.5

OTHER PUBLICATIONS

Normal Moveout and Velocity Relations for Flat and Dipping Beds and for Long Offsets, R. J. S. Brown, Geophysics Vol. 34 No. 2 p. 180– 195.
Discussion on Delta–T Formula for Obtaining Average Seismic Velocity to a Dipping Reflecting Bed, J. C. Pflueger, Geophysics, Vol. 19, pg. 339, 1954.

Primary Examiner—Benjamin A. Borchelt
Assistant Examiner—H. A. Birmiel
Attorney—William J. Scherback

[57] ABSTRACT

In the determination of acoustic velocity from a suite of seismograms, the signal power of windows from the seismograms is detected for different assumed values of velocity, vertical travel time, and dip. A function indicative of signal presence is plotted as a function of velocity for different vertical travel times to provide an indication of the acoustic velocity characteristic. A plot of signal power for different dip searches provides good results for seismograms from an area including dipping formations.

7 Claims, 6 Drawing Figures

12 - FOLD    96 TRACES
TIME - VELOCITY FUNCTION
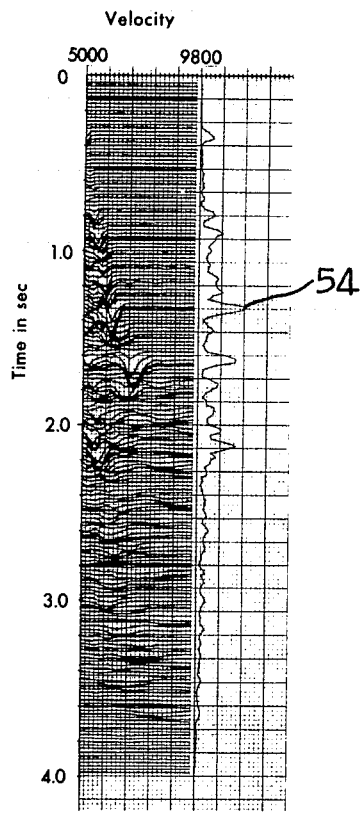
ENERGY FUNCTIONS
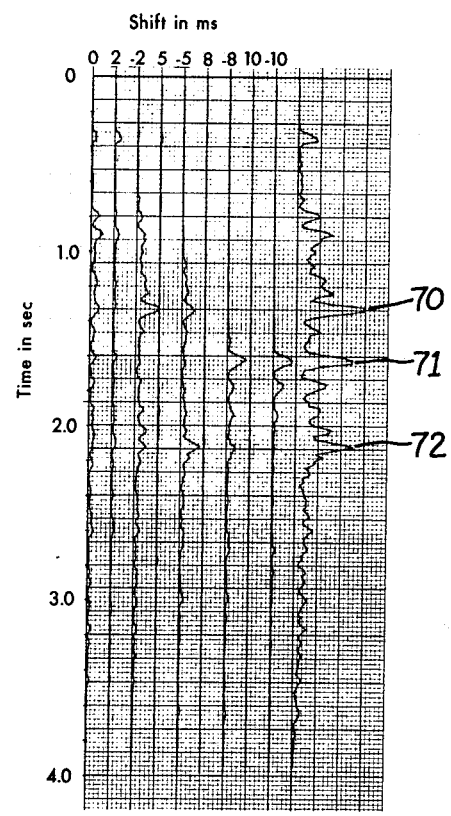
Fig. 5
Fig. 6

AUTOMATED PROCESS FOR DETERMINING SUBSURFACE VELOCITIES FROM SEISMOGRAMS

CROSS REFERENCE TO RELATED APPLICATIONS

This is a continuation of application Ser. No. 769,590, now abandoned, filed Oct. 22, 1968, which was a continuation-in-part of application, Ser. No. 752,600, now abandoned, filed Aug. 14, 1968.

BACKGROUND OF THE INVENTION

In seismic exploration the measurement of velocity is generally recognized as the major parameter in the processing and interpretation of seismograms. The determination of the acoustic velocity characteristic from seismograms is described in "Seismic Velocities From Subsurface Measurements," C. H. Dix, Geophysics, Vol. 20, pages 68 – 86, 1955.

Briefly, acoustic velocity is usually determined from seismograms by use of the relationship $$T_R = \sqrt{T_0^2 + H^2/V^2}$$

In the foregoing, $T_R$ is the travel time of a seismic wave travelling from a source to an interface and back to a surface receiver. This is the time of the reflection on the seismogram. $T_0$ is the reflection time on a trace which is obtained from a receiver positioned at the shot. H is the horizontal distance from the source to the receiver and V is the acoustic velocity. Velocity can be determined by standard curve fitting techniques.

Many field exploration techniques can be used to obtain the seismogram for use in velocity determinations. One commonly used field technique is referred to as the common reflection point technique for obtaining multiple coverage of subsurface reflecting points. Another exploration technique is referred to as "end on" shooting, that is, with the source on the same side of the detector spread for each generation of seismic energy.

While prior art techniques of velocity determination are generally acceptable, there is always the problem of picking the proper reflection time on the seismograms. This is particularly a problem where the seismograms have a low signal-to-noise ratio.

SUMMARY OF THE INVENTION

This invention relates to seismic exploration wherein the seismic velocity characteristic of the earth is determined from a suite of seismograms representing the reflection of seismic energy from reflecting points in the earth and more particularly to methods of and means for processing seismograms on computing apparatus to detect peaks in a signal detection function as indicative of seismic events for particular vertical travel times and velocities.

It is an important object of the present invention to provide an improved method of velocity determination that defines the seismic signal in the presence of noise and measures the velocity of the subsurface formations from which the seismic signal originated.

It is another object of the invention to provide a velocity measurement method that is independent of the point on the seismic wavelet which is picked for velocity measurements.

It is another object of the present invention to provide a method for producing a plot of reflection signals on a suite of seismograms as a function of assumed velocity for each of a plurality of values of vertical travel time.

It is another object of the invention to provide a velocity determination method of the type described above further including a dip search which makes it possible to obtain good velocity estimates from areas in which the subsurface formations are dipping.

DESCRIPTION OF THE DRAWINGS

FIG. 5 is an output plot produced in accordance with this invention;
and
FIG. 6 is another output plot produced in accordance with this invention.

DESCRIPTION OF A PARTICULAR EMBODIMENT

Figure 2:
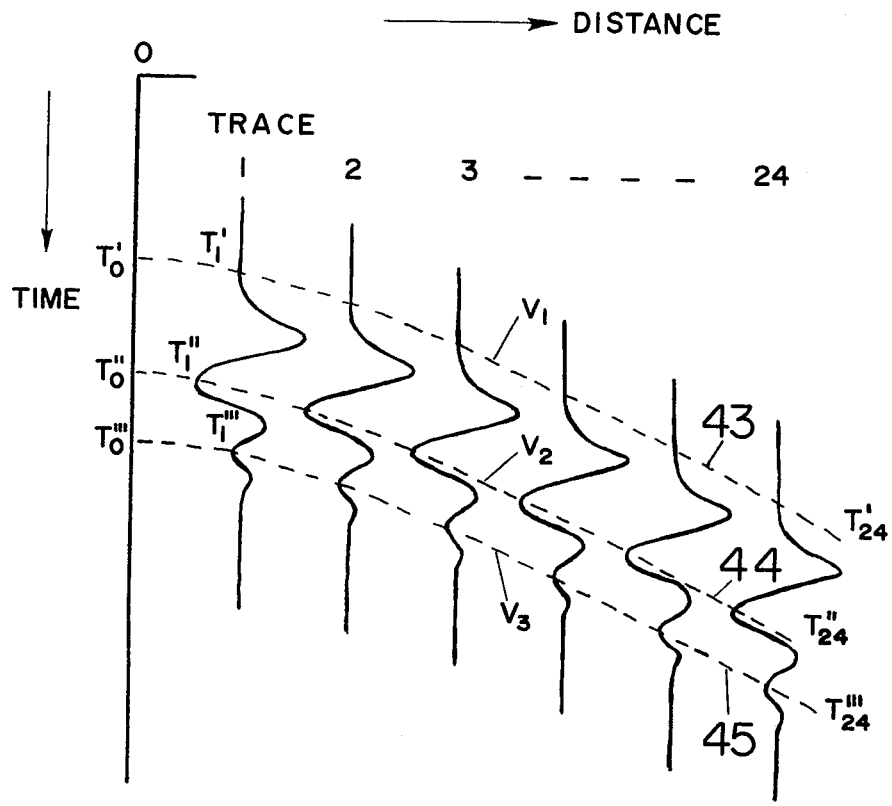
FIG. 2 shows a set of seismic traces.

The problem which has existed with prior art techniques of velocity determination can be more fully explained with reference to FIG. 2. FIG. 2 shows a plurality of traces, 24 traces being indicated, obtained along a line of exploration on the earth, distance along this line of exploration being indicated as the abscissa. Each trace in FIG. 2 includes a seismic wavelet from a common reflector, such reflections commonly being referred to as a seismic event. The seismic wavelet has a finite length which will vary in time for different records. The wavelet length can be as short as 20 milliseconds on high fidelity records to a wave train as long as 200 milliseconds on reverberated, tuned, or ghosted records. This wavelet length limits the seismic resolution.

Because the wavelet has a finite length, there is a problem in determining velocity. If velocities are determined at different points in the wavelet, the results will be different.

In FIG. 2, if the first leg of the wavelet is used for determining velocity as indicated by the dashed line 43, a first velocity $V_1$ will be determined. However, if the second leg of the wavelet is used, a second, different, velocity $V_2$ will be determined. (The dashed line 44 is drawn through the second leg of each wavelet.) If the last leg of the wavelet is selected (the dashed line 45 is drawn through the last leg of each wavelet) then still a third velocity $V_3$ will be determined. It can be shown that the velocities $V_1$, $V_2$, and $V_3$ are different one from the other and that $V_1$ is greater than $V_2$ which is greater than $V_3$.

Figure 3:
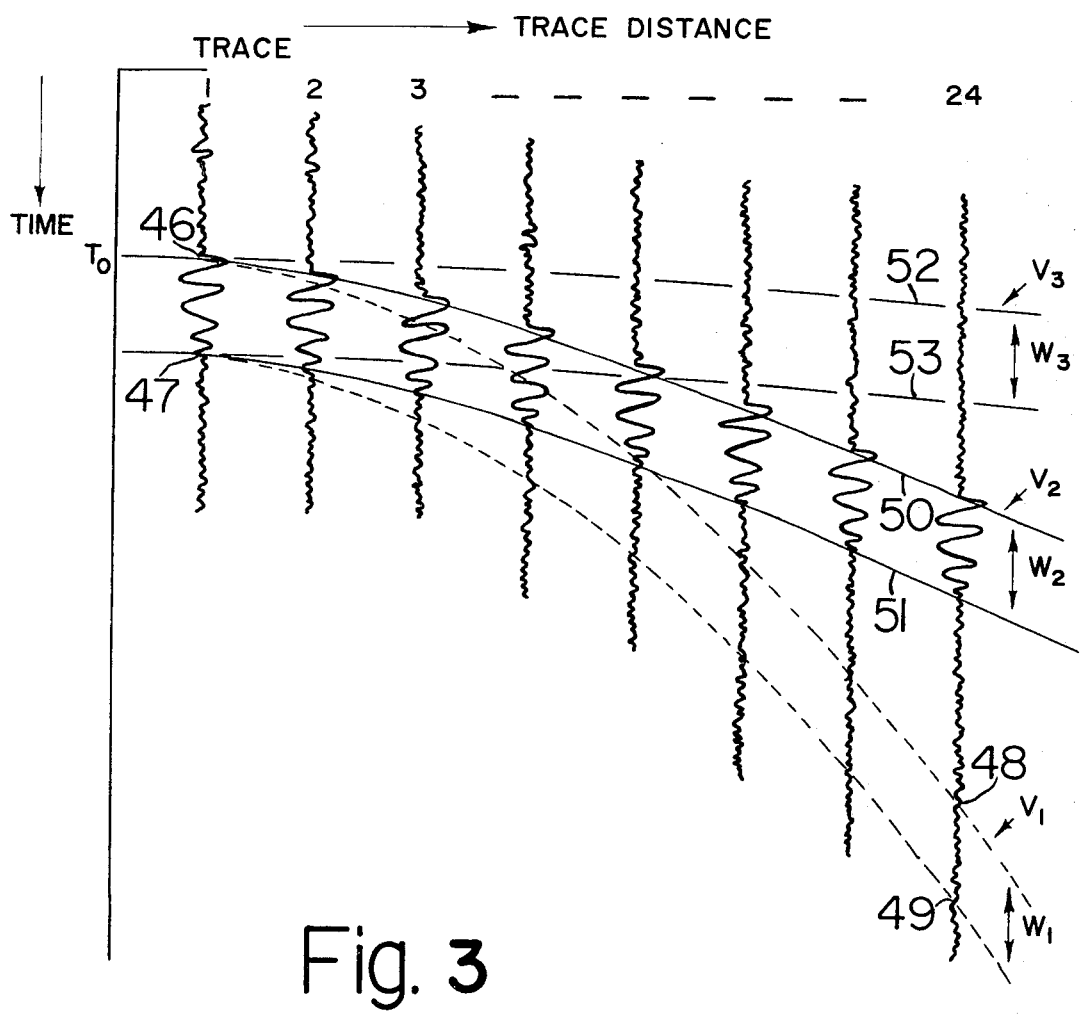
FIG. 3 shows a set of seismic traces.

The above problem, together with the problem of obtaining good velocity measurements from poor signal-to-noise ratio records, is obviated in accordance with the present invention. The invention can be briefly described with reference to FIG. 3 which shows a set of traces similar to the set shown in FIG. 2. In accordance with the present invention, a window of the seismic trace is selected at different given values of vertical travel time. For example, at the travel time $T_0$ a seismic window between the points 46 and 47 is selected. Note that $T_0$ is the reflection arrival time at a shot-to-receiver spacing of zero.

The window selected on the remaining traces in the suite is determined using an assumed velocity $V_1$.

The corresponding vertical travel time, referred to as $t_x$, on the remaining traces is calculated as will be subsequently described. Windows on these traces are selected, the window between the points 48 and 49 being selected for trace 24, for example. The signal in these windows is detected. Many signal detection techniques are suitable for use in the present invention and their use is within the scope of the invention. Signal detection is described, for example, in "Statistical Theory of Signal Detection," Hellstrom, Carl W., Pergammon Press, 1961. The particular form of detection described herein is a zero lag cross-correlation between the selected windows. In general, a function indicative of the presence of a signal is detected. In the cross-correlation technique, the signal power is detected.

Next, a different value of velocity, $V_2$, is assumed and the same operation is performed. Windows on each trace are selected, the selection being indicated by the limits of the lines 50 and 51. Again the signal power of all of these windows is detected. The search continues through all values of velocity in a given range. For example, a value of velocity $V_3$ is assumed and windows within the limits of the lines 52 and 53 are selected. The signal power of these windows is detected and stored.

Figure 4:
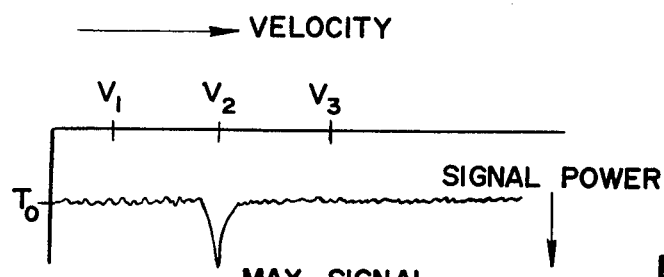
FIG. 4 shows signal power as a function of velocity for a particular time $T_0$.

It will be apparent that the signal power will be a maximum for the correct value of assumed velocity. This is best demonstrated in FIG. 4 which shows a plot of signal power as a function of assumed velocity for a particular value of vertical travel time $T_0$. The peak in the signal power at $V_2$ indicates that $V_2$ is the velocity for this seismic event.

Next, the vertical travel time $T_0$ is incremented and the foregoing steps repeated for different, iterated values of vertical travel time. If the signal power as a function of velocity is plotted for each incremented value of vertical travel time, there is produced a plot of the type shown in FIG. 5. It can be seen that the plot of FIG. 5 provides a good indication of the changing velocity characteristics of the earth as a function of depth. (The ordinant in FIG. 5 is time in seconds, but it will be appreciated that this can be directly converted to depth.) In FIG. 5, the curve 54 represents the maximum signal power as a function of time. This plot of maximum signal power provides a good indication of the presence of reflecting interfaces.

While the range of searched velocities, the increments in the velocity, and the increments in vertical travel time will all differ depending upon the particular type of seismograms being processed, one example of suitable values is as follows. A range of velocity from 5,000 to 9,800 feet per second was searched at velocity intervals of 200 feet per second. The vertical travel time was incremented by 20 milliseconds for each repetition of the procedure.

The length of the window selected should correspond to the expected length of a seismic wavelet in the seismogram. For example, a window 40 milliseconds length is generally suitable.

The process of the present invention can now be described in more detail with reference to the block diagram of FIG. 1. As indicated at 55, N traces are initially selected for processing and the coverage of the common depth points is specified as an input parameter. As an example, N is commonly 24 traces providing sixfold coverage of four common depth points. That is, $M = 4$.

As indicated at 56, other input parameters to the routine are specified. Specifically, the range of velocities to be searched between a minimum and a maximum and the increment in the velocity search are specified as input parameters.

As indicated at 57, the routine starts at a specified value of vertical travel time which is the input parameter $T_{START}$.

As indicated at 58, the vertical travel time for each of the traces in the suite is calculated. The vertical travel time for the first trace is assumed to be $T_0$. For each of the other traces, the vertical travel time is given by:

$$t_{xn} = \left( T_0^2 + \frac{X_n^2}{V_{FIRST}^2} \right)^{1/2}$$

For example, for the calculation of the vertical travel time for the second trace, the value of $x_n$ in the above is the horizontal distance between the seismometer from which the first trace was obtained and the seismometer from which the second trace was obtained. The value $V_{FIRST}$ is the first velocity used in the velocity search. A similar determination is made for the vertical travel time $t_{xn}$ for each trace.

Then, as indicated at 59, a window of given length is selected from each seismogram starting with the vertical travel time $t_x$.

These windows from the respective traces are used in the determination of the zero lag correlation signal power between the traces as indicated at 60. While such correlation detection is a particularly good technique for detecting signal in the presence of noise, other signal detection techniques may be used. For example, the amplitude of the windows could be added together sample by sample to form an output representing signal.

In the cross-correlation technique, each sample in the window is multiplied by the corresponding sample in all of the other windows and the products are summed. This type of cross-correlation differs from the usual type of cross-correlation used in seismic processing in that there is no time shifting of the inputs being correlated. That is, there is a straight-forward multiplication point by point of the samples in each window. For each velocity in the velocity search there will be ½ L (L–1) cross-correlation products to be summed where L is the number of traces. Where L is 24, as in the example under consideration, the total number of cross-correlation products is 276.

Figure 1:
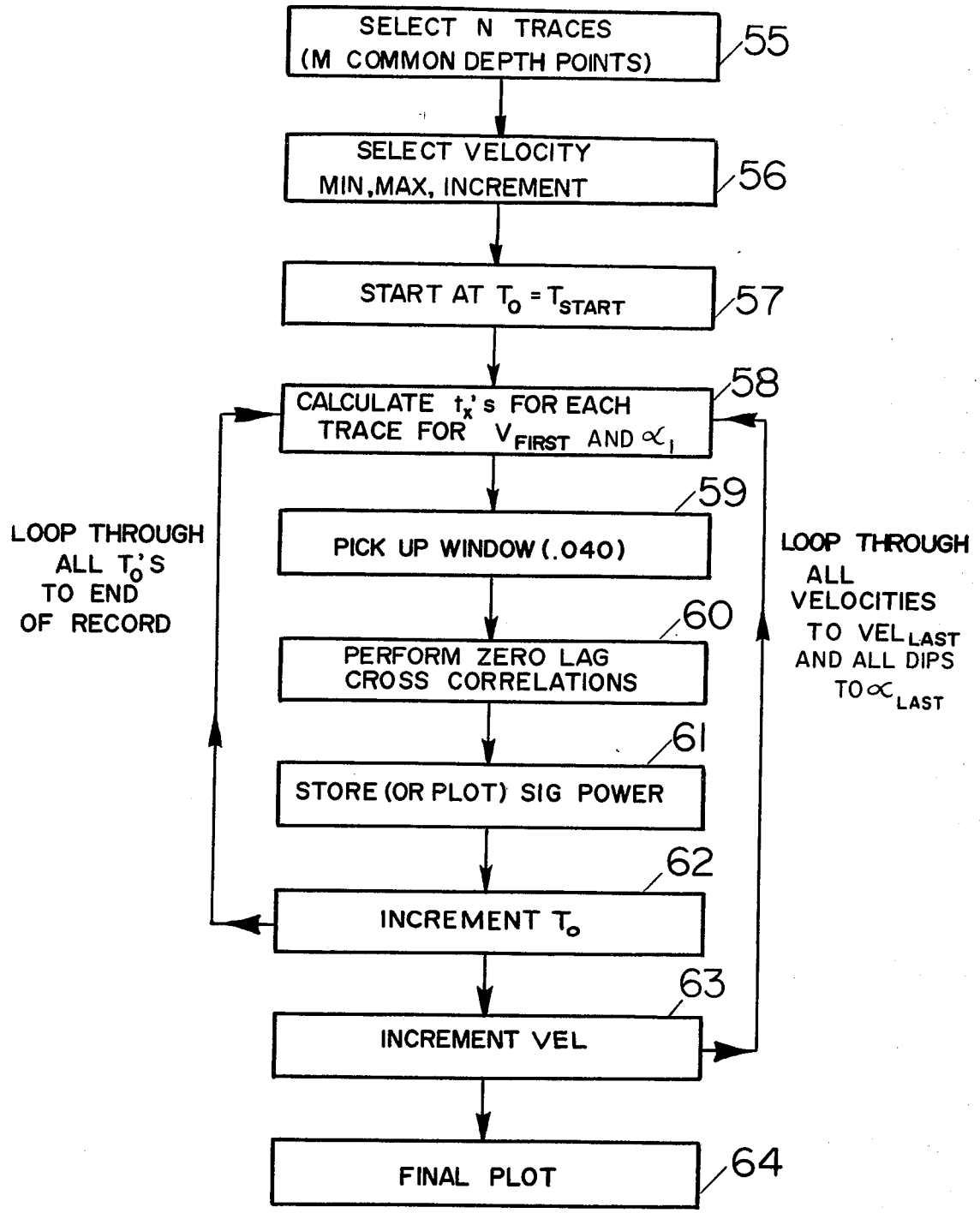
FIG. 1 is a block diagram of the invention.

The computed value of signal power is stored as indicated at 61 in FIG. 1.

Next, vertical travel time $T_0$ is incremented as indicated by 62. The steps 58 – 61 are repeated for the new value of vertical travel time. That is, these steps are looped through all times from the initial specified value $T_{START}$ to the end of the record.

As indicated at 63, the value of velocity is incremented. Steps 58 – 62 are performed for the new incremented value of velocity. These steps are performed for each iterated value of velocity between $V_{FIRST}$ and the end of the velocity range. As indicated at 64, the stored values are plotted in the final plot of the type shown in FIG. 5.

In FIG. 5, for each $T_0$ between 0 and 4.0 seconds there is a plot of signal power as a function of velocity. Peaks in these plots, on the left hand side of FIG. 5, show the velocity at various depths, or times, on the seismogram. Also plotted on FIG. 5 is the curve 54 which is the sum of the signal power detected at each time. Curve 54 provides a good indication of the presence of reflecting interfaces at various depths or times.

As an important improvement of the process described above, a dip search is incorporated in the process. With this improvement, good velocity estimates are obtained in the presence of dip. This improvement also produces better results in low signal-to-noise ratio areas.

In the calculation of the values of $t_x$ for each trace, as indicated at 58 in FIG. 1, an additional component is added to each calculated value of $t_x$. This additional component is the calculated value of time shift from trace to trace for an assumed value of dip. Different assumed values of dip are used to perform a dip search.

Assume that the dip is given by $\alpha$, the angle between the horizontal and the sloping or dipping formation. Also assume that the seismograms have been obtained with "end on" shooting, that is, with the source on the same side of the detector for each generation of seismic energy. Then, the values of $t_x$ as calculated in the step 58 are given by:

$$t_x = \left( T_0^2 + \frac{X_n^2}{V^2} \pm 2 \frac{X_n}{V} T_0 \sin \alpha \right)^{1/2}$$

where $X_n$ is the distance along said line of exploration between the detector producing a reference seismogram and the detector producing the seismogram for which $t_x$ is computed.

Where the seismograms do not represent common reflection points, with a dip $\Delta t$ between common reflection points, the travel times $t_x$ are generated in accordance with:

$$t_x = \left( T_0^2 + \frac{X_n^2}{V^2} \right)^{1/2} \pm \Delta t$$

In addition to looping through all values of velocity and vertical travel time as indicated in FIG. 1, the process will also loop through a series of assumed values of dip, both positive and negative. These components of dip can be expressed either in terms of the assumed dipping angle, that is, various values of angle, or they can be expressed in terms of the time shift between the first and last traces in the suite.

FIG. 6 is a plot of the total energy curves, that is, a plot similar to the curve 54 in FIG. 5, for each of a plurality of assumed values of dip. In this case, dip has been expressed as total time shift between adjacent CDP points. From FIG. 6 it can be seen that seismic event 70 occurring at approximately 1.133 seconds on the record was produced by an interface having a probable dip of approximately $-2$ milliseconds of shift. Similarly, the seismic event 71 occurring at approximately 1.6 seconds on the record has a probable dip of $-10$ milliseconds. The seismic event 72 occurring at 2.133 seconds has a probable dip of $-5$ milliseconds of shift. The milliseconds of shift specified by the chart of FIG. 6 can be directly converted to estimated angle of dip in degrees from the known spread geometry and acoustic velocity. In other words, there is plotted in FIG. 6 functions, for each value of assumed dip, representing the signal detected at each travel time $T_0$ so that peaks indicate the probable presence of reflections while the maximum peak at each travel time $T_0$ in said functions indicates probable dip.

From the foregoing it will be apparent that the method of the present invention can be practiced with the use of several well-known types of computing apparatus. The method is particularly suitable for use with a general purpose digital computer. While the invention can be implemented by various programs, one suitable program, specified in FORTRAN, is given below.

One particular computing system which is suitable for use is supplied by the Control Data Corporation under the general model designation 6600, and includes the following components:

Central Computer, 65K Memory
6608 Disc System
6602 Console Display
6681 Data Channel Converter
3228 Magnetic Tape Controller
607 Magnetic Tape Transport
3447 Card Reader Controller
405 Card Reader
3256 Line Printer Controller, and
501 Line Printer The particular FORTRAN program for carrying out the invention, including certain modifications, is given below, followed by a brief description of the operation of the program. This program is specified in FORTRAN language suitable for use on most digital computers. For a better understanding of the use of FORTRAN statements, reference should be made to "Introduction to FORTRAN," by S. C. Plumb, McGraw-Hill Book Company, New York, New York.

The input parameters which are applicable to the particular suite of seismograms being processed are as follows:

| | |
|---|---|
| DELV | –the increment in velocity for each loop. For example, 200'/sec. increments have been described. |
| NDELD | –number of dip searches to be performed. |
| NC | –the number of $T_0$'s for each velocity. |
| NTROUT | –the number of velocity increments. For example, 24 increments at 200'/sec. gives a range of velocity of 4800'/sec. to be searched. |
| DELT | –sampling rate of original data in sec. |
| VMIN | –first sweep velocity. |
| ALW | –length of cross-correlation window (in sec.). |
| SHIFT | –sampling rate at which velocity estimates are to be made. |
| NSOUT | –total record time for which velocity estimates are wanted in samples of DELT. That is, the number of samples processed for each trace. |
| TII | –starting time of estimation process. |
| NTRIN | –number of traces to process. |
| X (array) | –offset distance for each trace. |
| ALPHA (array) | –dip search time shifts between common depth point (CDP) sets. |
| NFOLD | –number of fold (CDP traces). |
| NSETS | –number of sets of CDP traces. |
| NTRIN = NFOLD * NSETS | |
| NSA | –number of samples each trace. |
| A | –array in which original traces are stored. |
| POWER, S, B | –intermediate storage for computations of correlation functions. |

The following set of FORTRAN statements includes a subroutine COMPCRS which performs the zero lag cross-correlation. This subroutine is given at the end of the listing. In the following, instruction identification numbers are given in the left hand column. It is understood that these are for purposes of identification only and do not indicate any sequency in which the instructions are performed. The listing is as follows:

```
          DO 506 NDIP=1,NDELD
          VMIN=NVMIN
300       DO 505 N=1,NTROUT
          CALL COMPCRS(CRS,A,S,B,DELT,NSOU
            T,VMIN,ALW,SHIFT,TII,NTRIN,NSB,X
            1,BMAX,ALPHA(NDIP),NFOLD,NSETS)
320       VMIN=VMIN+DELV
503       WRITE TAPE 5,(CRS(J),J=1,NC)
505       CONTINUE
506       %)' CONTINUE
          DO 805 I=1,40
          DO 805 J=1,250
805       AMP(I,J)=0.0
          DO 810 I=1,NDELD
          DO 820 J=1,NTROUT
          READ TAPE 5,(S(JJ),JJ=1,NC)
          DO 820 K=1,NC
820       AMP(J,K)=MAXIF(AMP(J,K),S(K))
810       CONTINUE
          DO 655 I=1,NDELD
          DO 655 N=1,NC
          RMAX=0.0
          DO 650 J=1,NTROUT
650       RMAX=MAXIF(RMAX,AMP(J,N))
655       B(N)=RMAX
          SUBROUTINE
            COMPCRS(CRS,POWER,A,S,B,DEL
            T,NSOUT,VMIN,ALW,SHIFT,TPLUS
            1,NTRIN,NSA,X,AMA
            X,ALPHA,NFOLD,NSETS)
          DIMENSION CRS(1),POWER(1),A(1
            ),S(1),B(1),KTR(14),X(1)
5         DO 10 J=1,NSOUT
10        CRS(J)=0.0
          DO 12 J=1,400
12        POWER(J)=0.0
15        VSQ=VMIN*VMIN
20        LW=ALW/DELT+.5
45        DO 50 J=1,2000
50        B(J)=0.0
55        LS=NSA/5+4
60        JSTRT=1
65        JSTP=LS
70        DO 145 N=1,NTRIN
75        TSUM=TPLUS
          TSUMA=TPLUS
91        JSTRT=JSTRT+LS
92        KK=1
95        TSQ=TSUM*TSUM+X(N)*X(N)/VSQ
            +2.0*X(N)*TSUM*SI
            NF(ALPHA)/VMIN
95        TSQ=TSUM*TSUM+X(N)*X(N)/VSQ
100       TX=SQRTF(TSQ)+(((N-1)/NFOLD)*2-
            (NSETS-1))*0.5*ALPHA
105       INA=TSUM/DELT+.5
110       INB=TX/DELT+.5
112       INC=INB+LW+1
115       IF(INC.GE.NSOUT)145,120
120       TSUM=TSUM+SHIFT
          INF=TSUMA/DELT+.5
          TSUMA=TSUMA+ALW
125       DO 130 J=1,LW
127       B(J+INE)=B(J+INE)+S(J+INB)
130       POWER(KK)=POWER(KK)+S(J
            +INB)*S(J+INB)
135       KK=KK+1
140       GO TO 95
145       CONTINUE
150       TSUM=TPLUS
          TSUMA=TPLUS
152       KK=0
155       IND=TSUM/DELT+.5
160       IF(IND.GE.NSOUT)198,165
165       TSUM=TSUM+SHIFT
          INE=TSUMA/DELT+.5
          TSUMA=TSVMA+ALW
170       KK=KK+1
175       CML=0.0
180       DO 185 J=1,LW
185       CML=CML+B(J+INE)*B(J+INE)
190       CRS(KK)=CML-POWER(KK)
          GO TO 155
195       continue
          RETURN
          END
```

Briefly, the foregoing listing performs the following operations on the suite of seismograms.

The instruction "DO 506 NDIP=1, NDELD" starts a do-loop which performs the required number of dip searches. The number of dips which are searched, specified by NDELD, can be any number but usually about 9 dip searches are sufficient.

The instruction "VMIN=NVMIN" sets VMIN equal to NVMIN.

The instruction 300 starts a do-loop which increments the velocity to successive values. The number of velocity increments is NTROUT. When the velocity has been incremented this many times, the loop exits at instruction 505. In each loop the velocity VMIN is incremented by the velocity interval DELV as specified by the instruction 320.

In each loop, the subroutine COMPCRS is called up to perform the cross-correlations and stores the resultant signal power in the appropriate array. Instruction 503 writes the value of signal power for this value of velocity and DIP on tape 5.

The group of instructions beginning with "DO 805 I=1,40" initiates a do-loop which reads out the signal powers stored on tape 5 and retains the maximum signal power for each $T_0$ and each value of velocity V.

Specifically, instructions "DO 805 I=1,40" and "DO 805 J=1,250" initiate do-loops which clean out the AMP array so that new values can be stored therein.

The instruction "DO 810 I=1,NDELD" initiates a do-loop which sets AMP (J,K) equal to the maximum value of the signal power for each value of dip. That is, the number of dips 1,is NDELD and the do-loop signal powers are read out for each dip search. .."

The instructions "DO 820 J=1,do-loop initiates a do-Loop which retains the maximum value of signal power for each increment of velocity, the number of increments being NTROUT. The signal powers stored on tape 5 are read out in response to "READ TAPE 5,... .."

The instruction "DO 820 K=1,NC" initiates a do-loop which determines the maximum value of signal power for each assumed value of $T_0$, for a number of $T_0$ equal to NC.

In each loop instruction 820 sets the array AMP (J,K) equal to the maximum value of signal power for each velocity $T_0$.

The group of instructions starting with "DO 655 I=1,NDELD" perform three nested do-loops which put the maximum values of the signal power in the B-array at each $T_0$, for each dip and for each value of velocity.

The first do-loop performs the required number of dip searches between 1 and NDELD.

The second do-loop determines the maximum value of signal power for each value of $T_0$ where NC is the number of $T_0$'s.

The third do-loop determines the maximum value of signal power for each increment of velocity between one and NTROUT.

Initially, the value RMAX is set to zero. During each loop RMAX is set equal to the maximum value of the signal powers searched in these three do-loops.

Referring now to the subroutine COMPCRS, the instructions 5-65 are initialization steps. That is, certain storage arrays are cleared and certain dummy parameters are set.

The instructions 70 - 145 make up a do-loop which determines the time $t_x$ on each trace and selects a window from the trace for that time. In instruction 95, TSUM corresponds to $T_0$ in the calculations performed in step 58 of FIG. 1, X(N) is the horizontal displacement $x$, and $V^2$ is the assumed velocity squared.

In instruction 100, the value of $t_x$ is determined. This is the square root of the value of TSQ previously determined in instruction 95, plus or minus a value of dip.

The dip adds or subtracts a time shift to or from $t_x$ for each trace, depending upon which side of the reference the trace is on. For example, assume there are four common depth points and there is sixfold coverage, that is, there are six seismograms for each common depth point. The total number of traces is 24. For the first six traces, that is $N = 1$ through 6, the quantity (N-1)/NFOLD *2 is 0. In fixed-point arithmetic used here, the quantity (N-1)/NFOLD is less than 1 and hence is equal to zero. The quantity (NSETS -1) *0.5 is equal to 1.5 and, therefore, a time shift of −1.5 ALPHA will be applied to each of traces 2 - 6.

For traces 7 - 12, the quantity (N-1/NFOLD) is a −1. Traces 7 - 12 will have applied thereto a correction of −0.5 ALPHA. Similarly, traces 13 - 18 will have applied thereto a correction of +0.5 ALPHA and traces 19 - 24 will have applied thereto a correction of 1.5 ALPHA.

Instructions 105 - 112 select a window from the trace for the selected value of $t_x$.

Instruction 115 checks to determine whether the routine has gone beyond the limits desired for processing. For example, if it is desired to process the first four seconds on the seismogram, NSOUT is equal to 1000 (assuming a sample interval of 4 milliseconds). Instruction 115 determines whether the processing has proceeded past the desired point.

Assuming that processing has not exceeded the desired limits, then $T_0$ is incremented at 120 so that the same determination can be made for a new value of $T_0$. If the processing has exceeded the desired limits, a jump is made to 145 to increment the do-loop.

The do-loop, including instructions 125 - 130, determines the sum of all samples in the window and the zero lag autocorrelation of each window, for each sample in the window. Specifically, instruction 127 stores in the array B(J+INE) the sum of all windows, sample by sample. Instructions 130 stores in the array POWER the zero lag autocorrelation of each window on each trace.

Instructions 155 - 190 determine the zero lag cross-correlations by subtracting the zero lag autocorrelations for each window from the square of the sums stored in the B array. It can be shown that the square of the sums of all samples in a window minus the zero lag autocorrelation function of each window is equal to the sum of the zero lag cross-correlation functions. This is a time saving technique for obtaining the zero lag cross-correlation functions without an undue amount of multiplication.

Finally, the signal power is output at instruction 190. Signal power CRS (instruction 190) is given for a given velocity for each of the assumed values $T_0$, velocity, and for each dip search. from Many variations of the foregoing routine will be apparent to persons of ordinary skill in this art. For example, the loops which perform the dip, vertical travel time $T_0$, and velocity searches have been described as being performed, that is, "nested," in a particular sequence. It will be apparent that the sequence of performance of these loops may be changed. In the foregoing programs it was assumed that the seismograms were obtained from a common depth point type of exploration. It will be appreciated that this invention can be carried out on seismograms from other types of exploration and specifically can be carried out for seismograms obtained from a type of exploration referred to as end-on shooting.

The appended claims are intended to cover any such modifications within the true spirit and scope of the invention.

What is claimed is:

1. In seismic exploration wherein the seismic velocity characteristic of the earth is determined from a suite of seismograms representing the reflection of seismic energy from reflecting points in the earth, said suite of seismograms being obtained from detectors spaced along a line of exploration, the method of automatically processing said seismograms in a data processing machine comprising:
   a. for given values of dip, travel time $T_0$, and seismic velocity V generating in said data processing machine physical representations of the corresponding travel times $t_x$ for each of the traces in said suite of seismograms;
   b. for each value of $t_x$ generated in step (a), selecting a window of each trace, said window having a time length which approximates the expected length of a seismic wavelet in said seismograms;
   c. detecting the presence of a seismic signal in the windows across said traces, said windows having time shifts from trace to trace corresponding with an assumed value of velocity and an assumed value of dip;
   d. repeating steps (a) – (c) in said data processing machine for different iterated values of dip, for different iterated values of velocity V, and for different iterated value of travel time $T_0$,
   e. generating a function indicative of the presence of the detected seismic signal for each travel time $T_0$; and
   f. for each value of dip generating functions representing the maximum signal detected at each travel time $T_0$ so that peaks in said functions indicate the probable presence of reflections from dipping subsurface reflectors at the assumed dip and the maximum peak at each travel time $T_0$ in said functions indicates dip.

2. The method recited in claim 1 further comprising: plotting the functions generated in step (f) for each value of dip.

3. A method recited in claim 1 further comprising: plotting said function indicative of the presence of the detected seismic signal for each travel time $T_0$.

4. The method recited in claim 1 wherein the travel times $t_x$ are generated in accordance with $$t_x = \left(T_0^2 + \frac{X_n^2}{V^2}\right)^{1/2} \pm \Delta t$$

where $X_n$ is the distance along said line of exploration between the source and the detector producing the seismogram for which $t_x$ is computed, and $\Delta t$ is the dip between adjacent sets of seismograms.

5. The method recited in claim 1 wherein the travel times $t_x$ are generated in accordance with $$t_x = \left( T_0^2 + \frac{X_n^2}{V^2} \pm 2 \frac{X_n}{V} T_0 \sin \alpha \right)^{1/2}$$

where $X_n$ is the distance along said line of exploration between the source and the detector producing the seismogram from which $t_x$ is computed, and $\alpha$ is assumed value of dip.

6. The method recited in claim 1 wherein the signal power of the windows is detected by the step comprising:

generating the zero lag cross-correlation function of the amplitude of all of said windows.

7. In seismic exploration wherein the seismic velocity characteristic of the earth is determined from a suite of seismograms representing the reflection of seismic energy from reflecting points in the earth, said suite of seismograms being obtained from detectors spaced along a line of exploration, the method of automatically processing said seismograms in a data processing machine comprising:

a. for given values of dip, travel time $T_0$, and seismic velocity V generating in said data processing machine physical representations of the corresponding travel times $t_x$ for each of the traces in said suite of seismograms;

b. detecting the presence of a seismic signal at times $t_x$ across said traces, said times $t_x$ having time shifts from trace to trace corresponding with an assumed value of velocity and an assumed value of dip; and (c) repeating steps (a) and (b) in said data processing machine for different values of dip, for different values of velocity V, and for different values of travel time $T_0$ 8. The method of claim 7 comprising:

for each value of dip generating functions representing the maximum signal detected at each travel time $T_0$ so that peaks in said functions indicate the probable presence of reflections from dipping subsurface reflectors at the assumed dip and the maximum peak at each travel time $T_0$ in said functions indicates dip.

9. The method of claim 7 comprising:

generating a function indicative of the presence of the detected seismic signal for each travel time $T_0$.

* * * * *

UNITED STATES PATENT OFFICE
CERTIFICATE OF CORRECTION

Patent No. 3,696,331  Dated October 3, 1972

Inventor(s) Norman J. Guinzy, Clyde W. Kerns, William H. Ruehle and Henry E. Teague It is certified that error appears in the above-identified patent and that said Letters Patent are hereby corrected as shown below:

On the title page, second column thereof, "7 Claims, 6 Drawing Figures" should be -- 9 Claims, 6 Drawing Figures--.

Column 4, line 32, "correlation" should be -- cross-correlation--;
Column 7, line 8, "sequency" should be --sequence--;
line 13, that portion of instruction 300 reading (CRS,A,  should read  (CRS,T,A,
line 18, that portion of instruction 506 reading %)'CONTINUE  should read  CONTINUE
line 23, that portion of instruction 820 reading MAXIF  should read  MAX1F
line 28, instruction 650 should read as follows: RMAX=MAX1F(RMAX,AMP(J,N))
line 34, instruction 5 should read as follows: DO 10 J=1, NSOUT
line 47, between instructions 95 and 100 add the following:

100  TX=SQRTF(TSQ)

line 53, that portion of instruction 120 reading INF=TSUMA/DELT+.5  should read INE=TSUMA/DELT+.5
line 62, that portion of instruction 160 reading 198,165  should read  195,165
line 64, that portion of instruction 165 reading TSUMA=TSVMA+ALW  should read TSUMA=TSUMA+ALW Column 8, line 37, after "dips" cancel "1," and insert --searched--;
same line, cancel "do-loop" and insert --maximum--;
line 38, " search.." " should read -- search." --;
line 39, cancel "do-loop" and insert -- NTROUT" --; and
line 40, "Loop" should read -- loop --.

UNITED STATES PATENT OFFICE
CERTIFICATE OF CORRECTION, contd.

Patent No. 3,696,331　　　　　　　　Dated October 3, 1972

Inventor(s) Norman J. Guinzy, Clyde W. Kerns, William H. Ruehle and Henry E. Teague It is certified that error appears in the above-identified patent and that said Letters Patent are hereby corrected as shown below:

Column 9, line 26, "traces 2-6" should read --traces 1-6 --; and
　　　　　line 53, "Instructions 130" should read
　　　　　　　　　　--Instruction 130--.
Column 10, line 2, after "search." cancel --from--; and
　　　　　line 47 (Claim 1), "value" should read --values--.

Signed and sealed this 20th day of February 1973.

(SEAL)
Attest:

EDWARD M. FLETCHER, JR.　　　　　　ROBERT GOTTSCHALK
Attesting Officer　　　　　　　　　Commissioner of Patents